United States Patent [19]
Delaney et al.

[11] Patent Number: 6,062,542
[45] Date of Patent: May 16, 2000

[54] CABLE LASHER

[75] Inventors: Kevin J. Delaney, Bristol; Gary Miller, Feasterville, both of Pa.

[73] Assignee: General Machine Products, Trevose, Pa.

[21] Appl. No.: 09/131,103

[22] Filed: Aug. 7, 1998

[51] Int. Cl.[7] .................................................. B65H 59/00
[52] U.S. Cl. ................................................. 254/134.3 CL
[58] Field of Search .................................. 254/134.3 CL, 254/134.3 R

[56] References Cited

U.S. PATENT DOCUMENTS

| | | | |
|---|---|---|---|
| 2,663,544 | 12/1953 | Harley | 254/134.3 CL |
| 2,668,688 | 2/1954 | Stanford | 254/134.3 CL |
| 3,482,818 | 12/1969 | Neale | 254/134.3 CL |

*Primary Examiner*—Robert C. Watson
*Attorney, Agent, or Firm*—Dann, Dorfman, Herrell & Skillman, P.C.

[57] ABSTRACT

A cable lasher is provided for securing a telephone or transmission cable to a support strand strung in the air between adjacent utility poles to prevent sagging of the transmission cable. As the cable lasher traverses a span of the support strand, the lasher pays out a line of lashing wire that is helically wrapped around the cable and the strand to bind them together. A series of tensioning rollers maintains constant tension in the lashing wire at all times to ensure a tight uniform wind. A gearbox translates linear motion of the lasher along the guide wire into rotational motion of a drum portion of the lasher. The rotation of the drum causes the wrapping of the lashing wire about the cable and the strand. A one-way clutch allows the drum to rotate only in one direction when the clutch is engaged in order to prevent any slacking in the wound lashing wire.

22 Claims, 8 Drawing Sheets cover the entire

CABLE LASHER

FIELD OF THE INVENTION

The present invention relates to a cable lasher for use in lashing a cable, such as a telephone or transmission cable, to a support strand, such as a strand supported in the air between utility poles. More specifically, the present invention relates to a cable lasher that may be displaced along a support strand that is strung between utility poles so that a lashing wire is paid out during displacement of the cable lasher to helically wrap and securely tie the cable to the support strand.

BACKGROUND OF THE INVENTION

Utility cables, such as telephone cables, are frequently routed between selected locations as overhead wiring suspended from a series of utility poles. In an effort to prevent the telephone cable from sagging between adjacent poles, the cables are frequently tied or lashed to a support strand that is tightly strung between the poles. For this purpose, a conventional lasher is pulled along the support strand with a tether either by a worker on the ground or with the assistance of a vehicle or capstan winch. The cable is first loosely supported by temporary support brackets hung from the support strand. The lasher is then mounted on the support strand in position to engage the loosely supported cable. As the lasher is pulled along the support strand, a lashing wire is helically wrapped around the transmission cable and the support strand in order to bind the cable to the tightly strung support strand.

One of the drawbacks, however, with conventional lashers is that a downward force must be exerted on the lasher by the tether to hold the lasher in proper contact with the support strand in order to properly drive the lashing mechanism to wrap the lashing wire around the cable and the support strand. Consequently, if the conventional lasher inverts during use, the lasher may become inoperative. Another problem is that any backward rotation of a conventional lasher during use causes the helically wrapped lashing wire to inadvertently slacken.

Another problem associated with conventional lashers is the inability to maintain uniform tension on the lashing wire during use. If uniform tension is not maintained, a uniformly tight wind cannot be achieved. In accordance with the present invention, a cable lasher is provided that overcomes many of the deficiencies in conventional lashers. The lasher of the present invention operates to effect a uniformly tight wind of lashing wire while preventing any slackening caused by inadvertent backward rotation of the lasher during use.

SUMMARY OF THE INVENTION

In accordance with the present invention, a cable lasher is provided for securing telephone and transmission cables to a support strand strung in the air between utility poles.

In general, the cable lasher is movable along the support strand so that the transmission cable is fed through the lasher. The lasher includes a support frame such as a central support tube that extends longitudinally through the lasher joining a front section to a rear section. A mid-section of the lasher is comprised of a rotating drum that is rotationally supported relative to the central support tube between the front and rear section of the lasher. The rotating drum may contain at least one reel of lashing wire for lashing the cable to the support strand. From the reel, the lashing wire is wrapped around tensioning rollers and then around a drive wheel to maintain constant tension in the lashing wire regardless of the amount of wire paid out during lashing. The free end of the lashing wire exits the rotating drum and is then tied off to provide the tension in the wire. As the lashing wire is reeled off during movement of the lasher along the support strand, the lashing wire drives the drive wheel which in turn drives a gearbox that translates linear movement of the lasher along the support strand into rotational movement of the drum. The gearbox causes the drum to rotate relative to the frame about the cable as the cable lasher rides on the support strand. As the drum rotates, wire from the reel of lashing wire is helically wrapped around the cable and the support strand lashing them together. The gearbox includes a drive wheel assembly that operates under the control of a one-way clutch provided on the drive wheel to control the rotational movement of the drum.

In specific operation, the cable lasher is moveably clamped onto the support strand in position so that the cable is operatively fed through a generally hollow interior of the lasher when the lasher is pulled from the ground with a handline by a worker or with the assistance of a vehicle or capstan winch. The cable lasher functions to maintain constant tension in the lashing wire through use of the tensioning rollers and the drive wheel so that a uniformly tight wind is effected. The tensioning rollers and the drive wheel are linked together by the lashing wire from the reel. The tensioning rollers cooperate with the drive wheel to maintain the constant tension in the wire as it is paid out from the reel of lashing wire during use.

The drive wheel assembly causes the drum to rotate as the lasher rides on the support strand. As the cable lasher moves along the support strand, the gearbox functions to translate linear motion of the lasher into rotational motion of the drum. For this purpose, the drive wheel is engageable, under control of a user-operated clutch, with a bevel gear of the gearbox to effect the translation of linear motion of the lasher into rotational motion of the drum. The bevel gear drives other gears of the gearbox to rotationally propel the drum. When in gear, the gearbox allows the rotating drum of the cable lasher to rotate as the lasher rides on the support strand. As the drum rotates, wire from the reel of lashing wire is helically wrapped around the cable and the support strand lashing them together. When the user-operated clutch is actuated to disengage the gearbox from the drive wheel, the drum is free to rotate in either rotational direction.

The drive wheel assembly operates during normal use to limit the rotational motion of the drum in a single rotational direction only. As the lasher rides along the strand, a one-way clutch provided on the drive wheel prevents the drive wheel from rotating in the opposite direction of the helical lashing. When the drive wheel is engaged with the gearbox, the one-way clutch of the drive wheel likewise prevents reverse rotation of the drum. If reverse rotation is needed, the user-operated clutch can be used to disengage the drive wheel from the bevel gear of the gearbox. For this purpose, the drive wheel has a hex head opening that accepts a mating hex head of the bevel gear to enable the bevel gear to be driven during rotation of the drive wheel. The hex head opening on the drive wheel can be disengaged from the mating hex head on the bevel gear by manual activation of the user-operated clutch. Manual displacement of a clutch release lever displaces a clutch fork which pushes the drive wheel out of engagement with the bevel gear. When the drive wheel is disengaged from the bevel gear, the gearbox is disengaged from the drive wheel and the rotating drum can be rotated in either direction. Additionally, the lashing wire can then be pulled from the lasher without motivating the gearbox to rotate the rotating drum.

The reel of lashing wire is recessed into the drum to prevent objects, such as existing cables from catching on the reel as the cable lasher rides along the support strand. A side door on the drum partially covers the recessed reel and is secured in a closed position with a lock bolt. The door as well as the exposed head of the lock bolt is also recessed within the outer circumference of the drum. Accordingly, objects are prevented from catching or snagging on the reel, the lock bolt, or the door as the cable lasher rides along the support strand.

An outer removable reel cover is provided on the reel to provide access to the supply of lashing wire on the reel. View slots may be provided in the outer reel cover so that the user can estimate the amount of wire remaining on the reel as the lashing wire is paid out. Since the side door only partially covers the reel, successive view slots become visible beneath the door even when the side door is closed. The use of wider view slots closer to the center of the reel is desirable to provide a better view as the reel gets closer to depletion.

A reel lock may be provided to hold the reel of lashing wire in stationary position on the drum as the removable reel cover is either removed or installed. For this purpose, the outside circumference of the reel of lashing wire has at least one lock notch. When the reel lock is moved into engagement with the lock notch, the reel of lashing wire is held stationary so that the reel cover may be installed and tightened into place.

A rear gate roller assembly is mounted on the rear end of the cable lasher providing a lower rear roller that may be swung opened and closed. The rear gate roller assembly includes a release knob for enabling the opening of the rear gate roller to permit the lasher to be placed on the cable. The rear gate roller cooperates with a pair of side rollers and an opposing upper rear strand roller to enclose and capture the cable therebetween. A thumb latch is located on the rear gate roller assembly to selectively permit adjustment of the position of the rear gate roller relative to the opposing strand roller along a shaft extending generally perpendicular between the gate roller and the strand roller. Movement of the gate roller up and down along the shaft enables the size of the opening for the cable between the rear gate roller and the opposing strand roller to be adjusted.

A series of rollers are also provided on the front end of the lasher to provide a circular roller surface generally conforming to the outer surface of the cable. The front rollers are configured with concave outer surfaces to engage the outer surface of the cable generally around the entire outer periphery of the cable so that the cable entering the cable lasher never contacts a static surface. The circular configuration of the rollers permits the cable to maintain constant contact with the concave surfaces of the rollers as the lasher rides on the support strand. A lower gate roller is provided which may be opened and closed to enable the cable to be inserted into the rollers. A front strand roller located on the front end of the lasher is provided in the series of rollers in position opposing the lower gate roller. The front strand roller is formed with a center groove for resting upon the support strand as the cable lasher rides on the support strand. The front strand roller includes a one-way clutch assembly to prevent reverse motion of the cable lasher. The front strand roller is also configured with a concave outer surface for engaging the cable so that the strand roller can simultaneously ride over both the support strand and the cable. The rear strand roller positioned at the rear end of the lasher may also include a strand groove for engaging the strand so that the rear strand roller simultaneously engages the support strand and the cable after being lashed together by the drum at the mid-section of the lasher.

A tapered front cowl is provided on the front end of the lasher to function as a nose cone to prevent objects from catching on the cable lasher as it rides along the support strand. The tapered front cowl covers the front end of the lasher and has a narrow front portion and a tail portion having an outer circumference that is larger than the recessed doors covering the mid-section drum. The tapered slope of the front cowl prevents objects from catching on the rotating drum as the cable lasher rides along the support strand.

Support strand locks are provided on the front end of the lasher to open and close a pair of movable front jaws that releasably grasp the support strand to retain the cable lasher on the support strand. The front jaws can be opened to receive the support strand and then closed into an overlapping position for holding onto the support strand. Support strand locks and jaws may also be located on the rear end of the lasher to provide additional safety as the cable lasher rides along the support strand.

BRIEF DESCRIPTION OF THE DRAWINGS

The foregoing summary, as well as the following detailed description of the preferred embodiments of the present invention, will be better understood when read in conjunction with the accompanying drawings, in which.

DETAILED DESCRIPTION OF THE PREFERRED EMBODIMENTS

Referring to the Figures in general, a cable lasher, generally designated 20, is provided for riding on a support strand strung in the air between utility poles for the purpose of securing a telephone or transmission cable to the support strand. As the lasher 20 moves along the support strand, the lasher wraps a lashing wire around the cable and the support strand to tie the cable to the strand.

In operation, a support strand is tightly strung in the air between utility poles. The transmission cable is then temporarily suspended from the strand by temporary support brackets. The cable lasher 20 is then removably clamped onto the support strand in a position straddling the transmission cable. The lasher is then secured around the cable. The lasher is then pulled along the support strand so that the transmission cable is fed through the lasher. As the cable lasher 20 rides on the support strand, lashing wire is helically wrapped, or tightly lashed, around the cable and the support strand tying them together.

Figure 1:
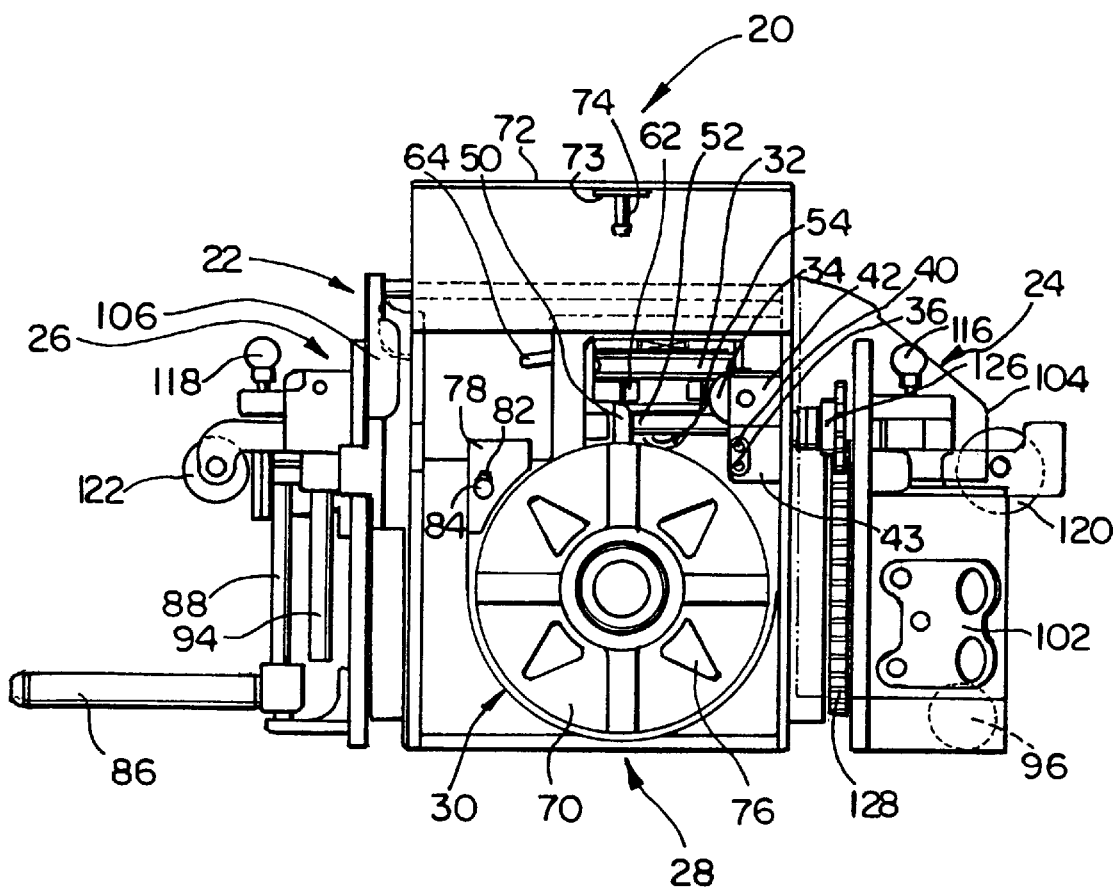
FIG. 1 is a side elevational view of a cable lasher in accordance with the present invention with a rear gate roller in the open position and a right side door in the open position.
Figure 2:
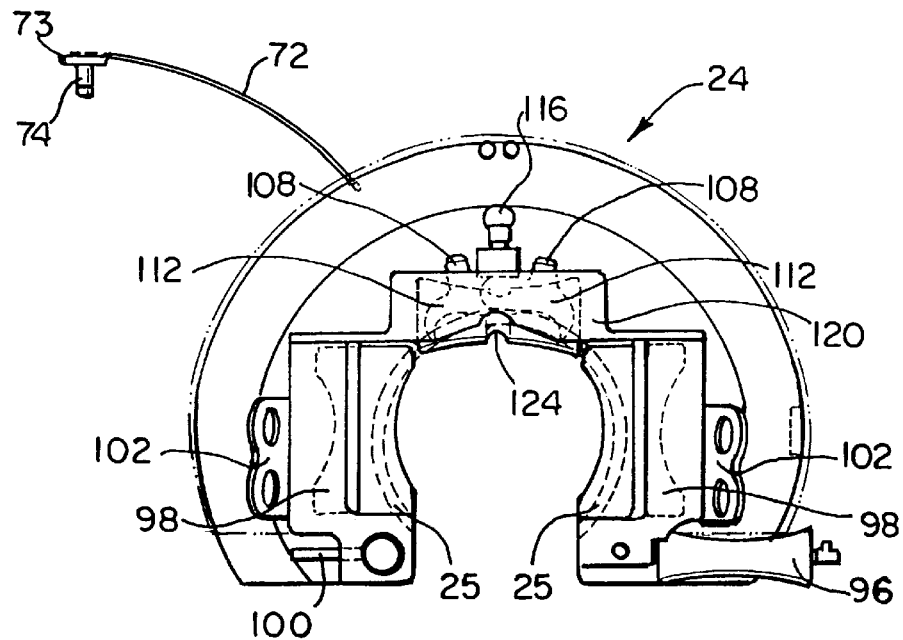
FIG. 2 is a front elevational view of the cable lasher shown in FIG. 1 showing the front gate roller, front strand locks and claws in the open position.
Figure 3:
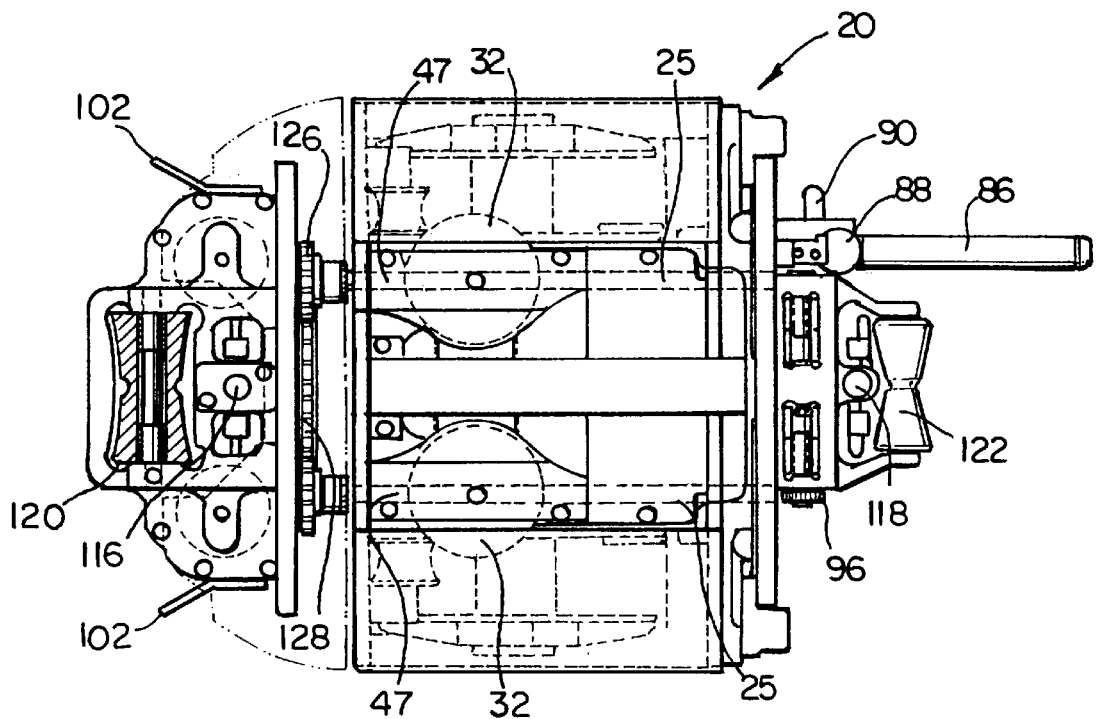
FIG. 3 is a top plan view of the cable lasher shown in FIG. 1 with the rear gate roller in the open position but with the side doors closed.

Referring to FIGS. 1–3, the cable lasher 20 includes a center support tube 25 that joins a front end 24 of the lasher with a rear end 26 of the lasher 20 to provide a support frame 22. A mid-section of the lasher includes a rotating drum 28, shown within the dot-dash Line A in FIG. 4, that rotates about the center support tube 25. The rotating drum 28 includes two individual lashing assemblies on opposite sides of the rotating drum 28 that perform the same function. Each assembly has a wire reel 30, a series of tensioning rollers 34, 36, a drive wheel 32, and a drive wheel assembly 60. The reels of lashing wire 30 on opposite sides of the drum 28 can be utilized individually or simultaneously to lash the cable to the support strand with the lashing wire. When both reels are used, a double lash is effected. Since the individual lashing assemblies on both sides of the rotating drum 28 perform the same function, only one assembly will be described in detail.

Figure 12:
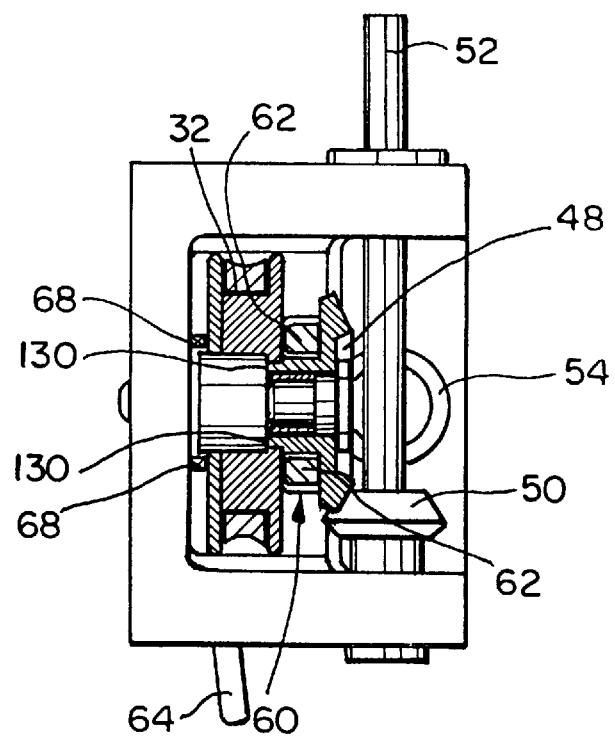
FIG. 12 is a partial side sectional view of a gear box and clutch assembly for the lasher shown in FIG. 1 showing a manually-operated clutch in the engaged position.

To facilitate a tight uniform wind, tensioning rollers 34, 36 are provided in the lashing assembly to maintain tension in the lashing wire as the lasher moves along the support strand. From the reel 30, the lashing wire 38 is partially wrapped around the pair of tensioning rollers 34, 36 and then around a drive wheel 32 in a configuration to maintain constant tension in the lashing wire regardless of the amount of wire paid out during displacement of the lasher along the support strand. A gearbox 46 operable by a manual clutch lever 64 to engage and disengage from the drive wheel 32 controls rotation of the drum 28 so as to permit rotation of the drum in only one direction when the gearbox is engaged with the drive wheel 32. A one-way clutch provided on the drive wheel enables the drive reel to rotate in only a single rotational direction. Accordingly, when the drive wheel engages the gearbox, the drum can only rotate in one direction. When engaged with the drive wheel 32, the gearbox 46 causes the drum 28 to rotate as the cable lasher 20 rides on the support strand. As the drum rotates, the lashing wire from the reel is helically wrapped around the cable and the support strand lashing them together. In normal operation, the manual clutch lever 64 is biased into a drive position as shown in FIG. 12 to cause the drive wheel to engage the gearbox to drive the rotational movement of the drum in one direction.

Figure 7:
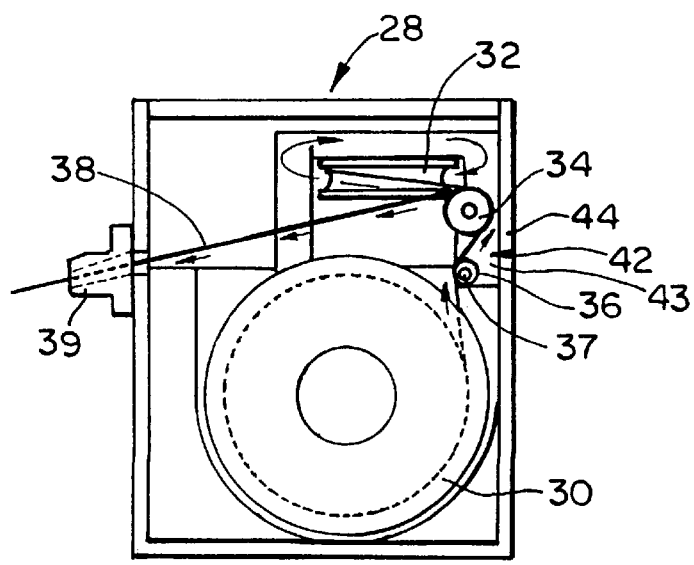
FIG. 7 is a schematic side view of a drive wheel and series of tension rollers for the lasher shown in FIG. 1 with lashing wire shown in its routing path.

As best shown in FIG. 7, the tensioning rollers 34, 36 and the drive wheel 32 cooperate to maintain constant tension in the reel of lashing wire 30. The lashing wire 38 is routed from the reel 30 to smaller tensioning pulley 36, then around larger tensioning pulley 34, and then around the drive wheel 32. More specifically, the lashing wire 38 from the reel 30 is partially deflected around the smaller tensioning pulley 36, then wrapped about half-way around the larger tensioning pulley 34, and then wrapped completely around the drive wheel 32. As shown in FIG. 7, the lashing wire 38 emerging from the drive wheel crosses beneath the lashing wire 38 being fed onto the drive wheel 32 from tensioning pulley 34. From the drive wheel 32, the wire 38 exits from an exit roller 39 on the rotating drum 28. The routing path of the lashing wire around the drive wheel 32, the larger tensioning pulley 34, and the smaller tensioning pulley 36 maintains constant tension in the lashing wire 38 during use of the lasher.

Figure 6:
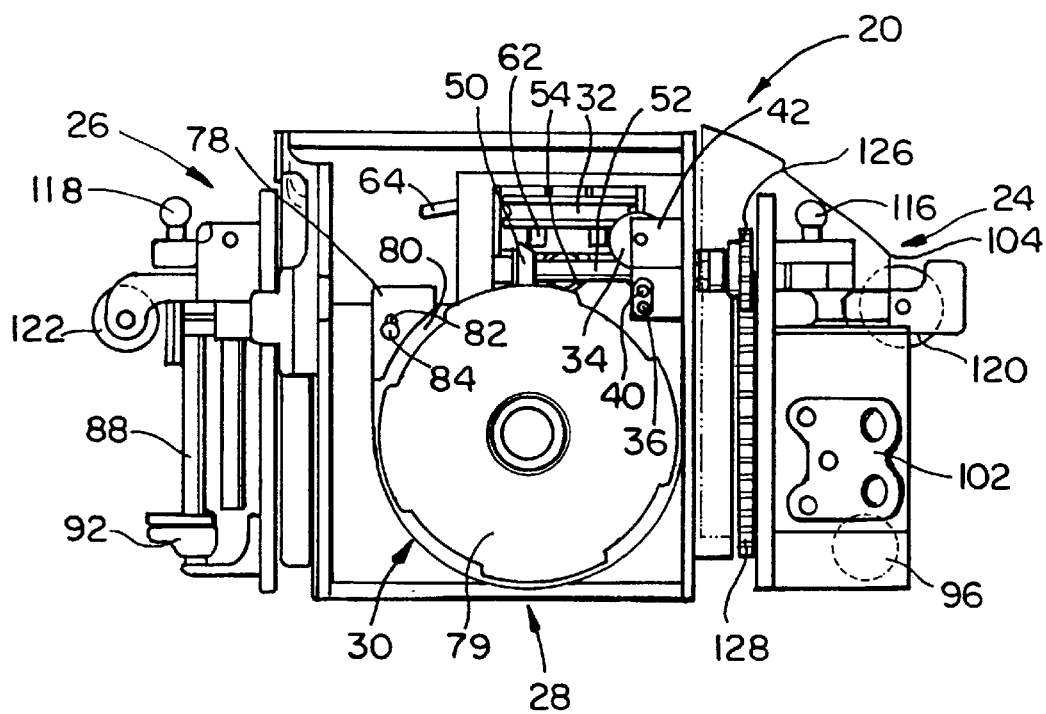
FIG. 6 is a right side elevational view of the cable lasher shown in FIG. 1 except that the rear gate roller is now in the closed position and the outer lashing wire reel cover and the right side door are removed.
Figure 10:
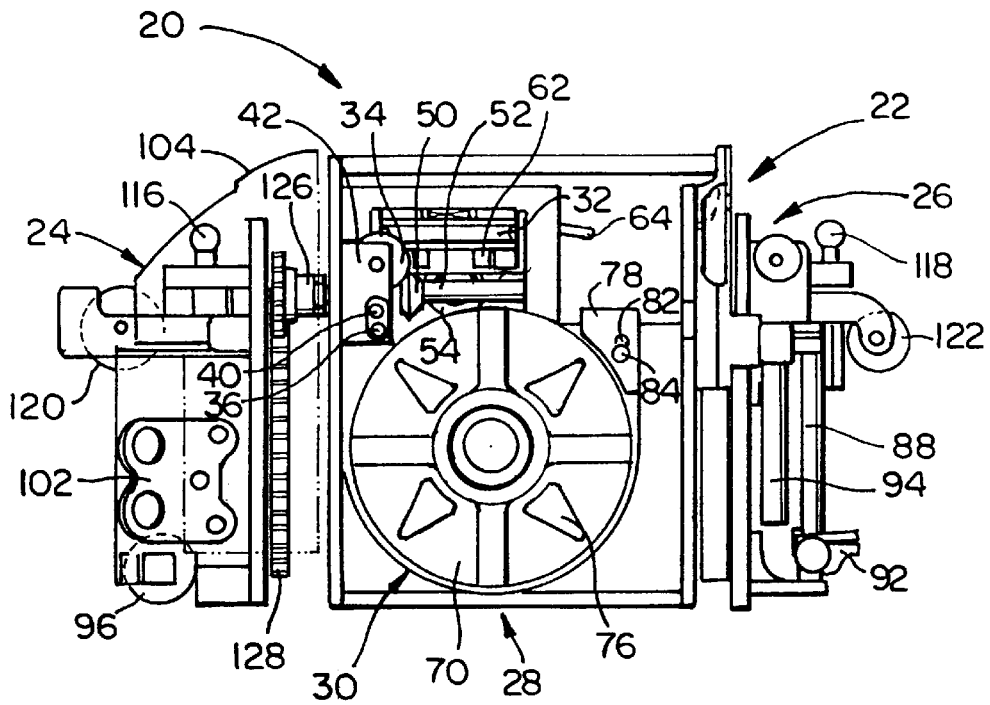
FIG. 10 is a left side view of the cable lasher similar to FIG. 4 except that the front and rear gate rollers are in the closed position and the left side door has been removed for purpose of clarity.

To permit the amount of tension on the lashing wire to be adjusted, a series of adjusting holes 40 are provided in an end bracket 42 mounted on a front plate 44 of drum 28 to permit the smaller tensioning pulley 36 to be moved to a selected position closer to or further from the larger tensioning fully 34, as best shown in FIGS. 1, 6 and 10. The change in relative distance between the two pulleys 34, 36 changes the amount of tension in the lashing wire. The smaller tensioning pulley 36 can be moved to a selected position relative to the larger pulley to accommodate the desired lashing wire route. For this purpose, a releasable axle pin 37 is provided on the smaller tensioning pulley 36 for insertion into the desired hole 40 in the end bracket 42 to hold the small pulley 36 in the desired position.

As best shown in FIGS. 1, 3, 6, 7, 9 and 10, the lashing wire 38 is captured at all points during its traveling route to prevent inadvertent slippage of the lashing wire from the drive wheel and tensioning pulleys. The lashing wire 38 is prevented from slipping off the drive wheel 32, the larger tensioning pulley 34, and the smaller tensioning pulley 36 by the end bracket 42 and a drive wheel cover plate 47. The end bracket 42 is mounted on the front plate 44 in position to support the larger tensioning pulley 34 and the smaller tensioning pulley 36 as shown in FIG. 7. The end bracket 42 includes a pair of parallel side plates 43 that sandwich the tensioning pulleys 34 and 36 therebetween to ensure that the lashing wire 38 will not slip off the larger tensioning pulley 34 or the smaller tensioning pulley 36. The end bracket 42 also helps to retain the lashing wire 38 in place between the larger tensioning pulley 34 and the smaller tensioning pulley 36. The drive wheel cover plate 47, shown best in FIGS. 3 and 9, covers a large portion of the top of the drive wheel 32 and ensures that the lashing wire 38 will not slip off the top of the drive wheel 32. The use of the end bracket 42 and the drive wheel cover plate 47 serves to capture the lashing wire 38 at all times and thereby prevent the lashing wire 38 from slipping off the drive wheel 32, the larger tensioning pulley 34, or the smaller tensioning pulley 36.

The use of the drive wheel 32, larger tensioning pulley 34, and smaller tensioning pulley 36 to route the lashing wire 38 in a snaked path through the lasher maintains constant tension in the lashing wire 38 during use. Tension is maintained constant regardless of the amount of lashing wire 38 that has been paid out from the reel of lashing wire 30 during use. The tension in the lashing wire also creates the necessary force to turn the drive wheel 32 which in turn drives the gearbox 46.

Figure 4:
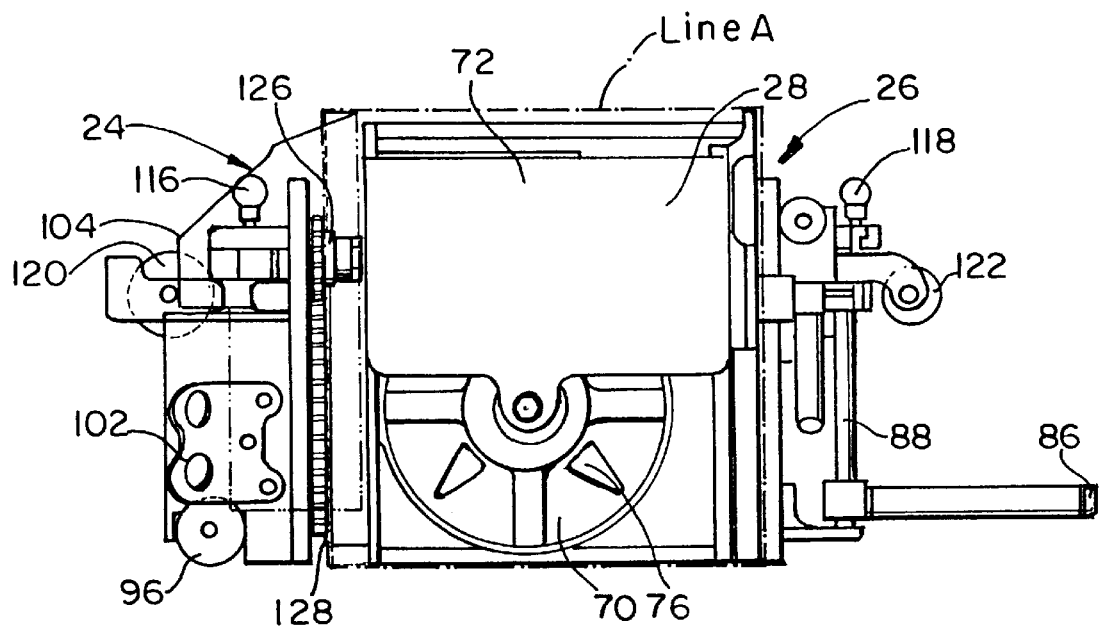
FIG. 4 is a left side elevational view of the cable lasher shown in FIG. 1 with the front and rear gate rollers in the open position, a left side door in the closed position, and with a rotating drum at the mid-section of the lasher shown within the dot-dash line.
Figure 13:
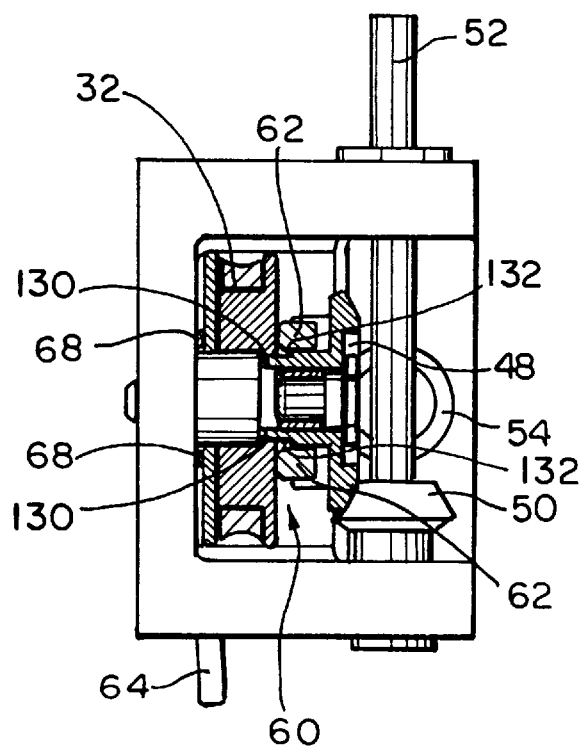
FIG. 13 is a partial side sectional view of the gear box and clutch assembly showing the clutch in the disengaged position.
Figure 14:
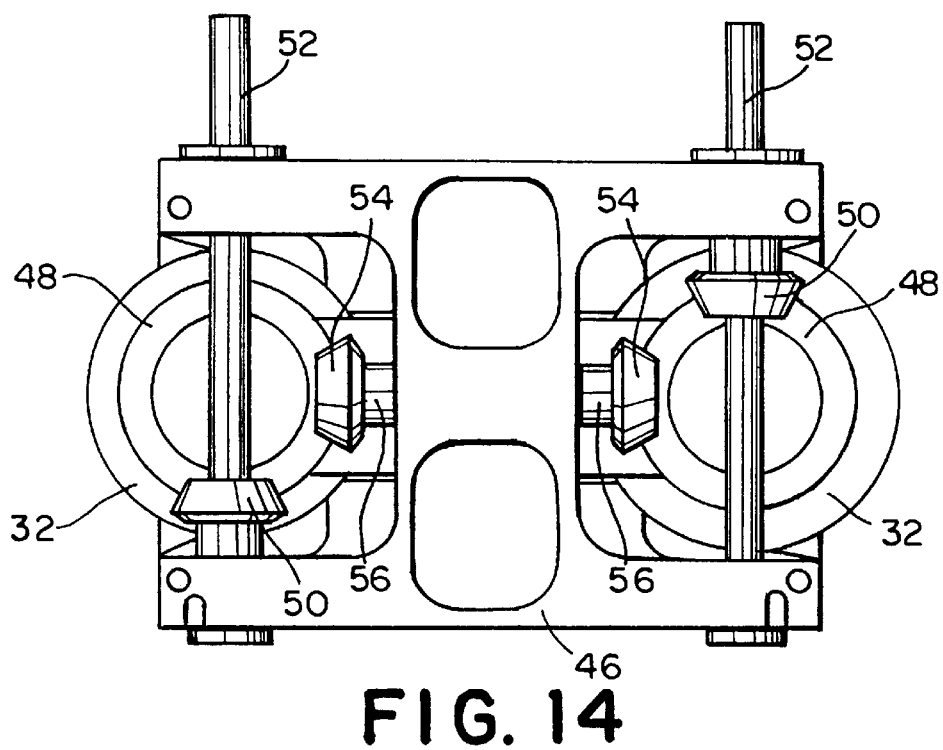
FIG. 14 is an enlarged bottom plan view of the gear box shown in FIG. 13 showing the arrangement of bevel and pinion gears.
Figure 15:
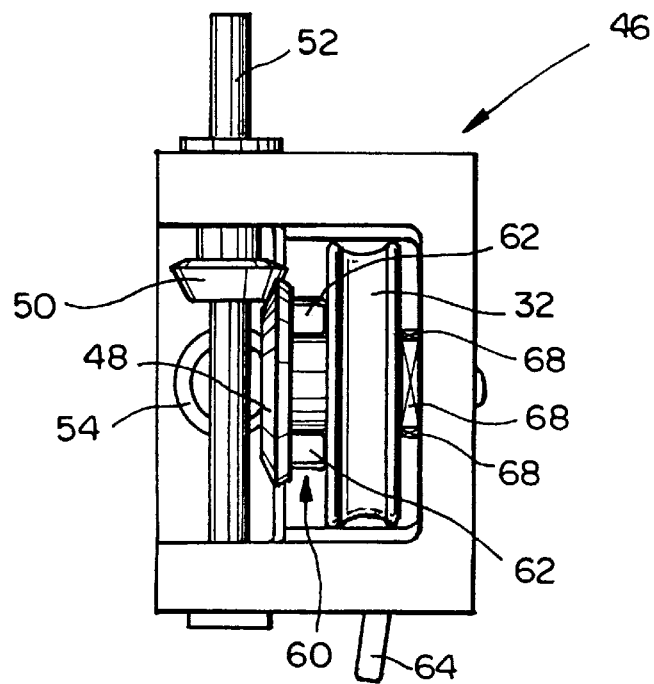
FIG. 15 is a side elevational view of the gearbox and clutch assembly of FIG. 14 showing the clutch in the engaged position.

Referring to FIGS. 1, 6, 10, and 12–15, the gearbox 46 functions to rotate the drum 28 about the transmission cable as the lasher is pulled along the support strand. Referring to FIGS. 14 and 15, as the lashing device 20 is pulled from the ground with a handline by a worker or with the assistance of a vehicle or capstan winch, the tension in the tied off lashing wire causes the lashing wire to frictionally engage and drive the drive wheel 32. As the drive wheel 32 rotates, the drive wheel turns a bevel gear 48 of the gear box 46. The bevel gear 48 engages and turns a first beveled pinion gear 50 mounted on a first shaft 52. Referring to FIGS. 1, 6, and 10, the first shaft 52 turns a small gear 126 which rotates around a large stationary segmented ring gear 128 attached to the front end 24 of the lasher. As best shown in FIG. 4, when the small gear 126 rotates around the large stationary segmented ring gear 128, the rotating drum 28, shown within the dot-dash Line A, rotates around the cable and support strand.

Referring to FIGS. 14 and 15, as the drive wheel 32 rotates and turns the bevel gear 48, the bevel gear 48 also turns a second beveled pinion gear 54 mounted on a second shaft 56. The second shaft 56 is connected to an identical lashing assembly on the other side of the rotating drum 28 to assist in driving the other lashing assembly.

In operation, the gearbox 46 translates linear motion of the lasher into rotational motion of the drum in one rotational direction. The gearbox causes the rotating drum 28 of the cable lasher 20 to rotate as the lasher rides on the support strand in order to wrap the lashing wire around the support strand and the cable. The use of the tension of the lashing wire to drive the gearbox 46 via drive wheel 32 enables the lasher to be pulled in the forward direction from any pulling angle. As the rotating drum 28 rotates, lashing wire 38 from the reel of lashing wire 30 is dispensed through the exit roller 39 and is helically wrapped around the cable and the support strand binding them together.

Referring to FIGS. 12, 13 and 15, the drive wheel 32 incorporates a one-way clutch that operates to limit the rotational motion of the drive wheel in only a single rotational direction and, in operation, therefore limits rotation of the rotating drum 28 in a single rotational direction as well. The one-way on the drive wheel clutch prevents the rotating drum 28 from rotating in the opposite direction that the lashing wire is wound. This ability of the drum to rotate only in the proper direction during use maintains the tension and integrity of the lash around the cable and support strand.

The operation of the manual clutch for disengaging the drive wheel from the gearbox will be considered. As shown best in FIGS. 12 and 13, the drive wheel 32 has a hex head opening 130 that accepts a mating hex head 132 on bevel gear 48 to thereby drive the bevel gear 48 during rotational movement of the drive wheel 32. A spring 68 applies force against the drive wheel 32 to maintain the hex head opening 130 of the drive wheel 32 in engagement with the hex head 132 of the bevel gear 48. When the hex head opening 130 of the drive wheel 32 and the hex head of the bevel gear 48 are engaged, the drive wheel 32 and the bevel gear 48 operate as a single rotating unit. During operation, as the cable lasher 20 rides on the support strand causing the lashing wire 38 to unreel, the lashing wire drives the drive wheel 32 and the engaged drive wheel 32 and bevel gear 48 rotate together. The rotating bevel gear 48 turns the pinion gears 50, 54 and shafts 52, 56 in the gearbox 46 to cause rotation of the rotating drum 28 in a single rotational direction. By preventing rotation of the rotating drum 28 in the opposite direction of the lashing wind, the tension of the lashing wire around the recently lashed cable and support strand is maintained. As such, the cable lasher is prevented from inadvertent reverse rotation during lashing so that the lash wire does not become slack.

To permit the drum to freely rotate in either direction, the hex head opening 130 on the drive wheel 32 can be disengaged from the hex head 132 on the bevel gear 48 by activating the manual clutch release lever 64. The clutch release lever 64 is movable between an engaged position, shown in FIGS. 12 and 15, and a disengaged position, shown in FIG. 13. To disengage the gearbox, the clutch release lever 64 is manually activated to lift a clutch fork 62, which in turn displaces the drive wheel 32 against the bias of spring 68 out of engagement with the bevel gear 48 as shown in FIG. 13. When the drive wheel 32 is disengaged from the bevel gear 48, the rotating drum 28 can be rotated in either direction. Additionally, when the gearbox is disengaged, the lashing wire 38 can be freely pulled from the drive wheel 32 without motivating the gearbox 46 to rotate the rotating drum 28.

In normal operation, the one-way clutch on the drive wheel 32 prevents the rotating drum 28 from reverse rotation due to any imbalance between the two reels of lashing wire 30 on opposite sides of the drum 28. Otherwise, as one reel of lashing wire 30 runs out of wire and the opposite reel of lashing 30 wire does not, the heavier reel of lashing wire 30 may tend to cause the drum to reverse rotate to the bottom of the lasher. The one-way clutch provided on the drive wheel 32 prevents this type of imbalanced rotation.

Referring to FIGS. 1, 4, and 10, the reel of lashing wire 30 is recessed from the outside diameter of the lasher to prevent objects, such as existing cables, from catching on the reel as the cable lasher rides along the support strand. An outer reel cover 70 is removably mounted on the exposed side of the reel of lashing wire 30. The reel is recessed sufficiently into the drum so that the outside reel cover 70 is recessed into the interior of the rotating drum 28. A side door 72 is hingedly connected to the rotating drum 28 and is movable from an open position to a closed position to at least partially cover the reel and to enclose the tension pulleys and the drive wheel. When the door 72 is in the open position as shown in FIG. 1, the outside reel cover 70 is accessible to a user. When the door 72 is in the closed position, as shown in FIG. 4, the door 72 at least partially covers the reel cover 70 and the reel of lashing wire 30. A lock tab 73 on the door is bent inwardly from the door so that the head of the lock bolt can be recessed into the interior of the drum. A lock bolt 74 engageable with the lock tab and the center of the wire reel 30 secures the door 72 to the reel when the door is in the closed position to prevent inadvertent opening of the door during use of the lasher. By using an inwardly offset lock tab 73 on the door, the head of the lock bolt 74 does not project beyond the exterior of the side door or beyond the outer diameter of the drum. As such, objects can not catch or snag on the side door or the lock bolt 74 as the cable lasher 20 rides along the support strand.

As shown in FIGS. 1, 4, and 10, view slots 76 may be provided in the outer reel cover 70 so that the user can estimate the amount of lashing wire 38 remaining on the reel of lashing wire 30 as the lashing wire is paid out. For this purpose, at least one view slot 76 may be cut out of the side of the reel cover 70. The view slots 76 are preferably wider proximate to the center of the reel of lashing wire 30 and narrower toward the outer perimeter of the reel of lashing wire 30. At the time the reel begins to run out, the use of the wider slot at the center of the reel enables the user to better estimate the amount of lashing wire 38 remaining on the reel of lashing wire 30.

As shown in FIG. 6, a reel lock 78 is provided to hold the reel of lashing wire 30 in position whenever the reel cover 70 is removed or installed. The outside circumference of the inner wall 79 of the reel of lashing wire 30 has cutouts or lock notches 80 for engagement by the reel lock. To permit movement of the reel lock in and out of engagement with a lock notch 80, the reel lock 78 has an elongated slot 82 to permit movement of the reel lock 78 relative to a lock screw 84 passing through the slot. A spring biases the reel lock 78 into a disengaged position from the lock notches 80 on the reel of lashing wire 30. When the reel lock 78 is manually pushed into engagement with a lock notch 80, the reel lock 78 prevents the reel from rotating and thereby holds the reel of lashing wire 30 stationary. When the reel lock 78 engages the notch 80 to hold the reel of lashing wire 30 stationary, then the outside reel cover 70 can be screwed into place on the reel to hold the reel cover in place.

Figure 5:
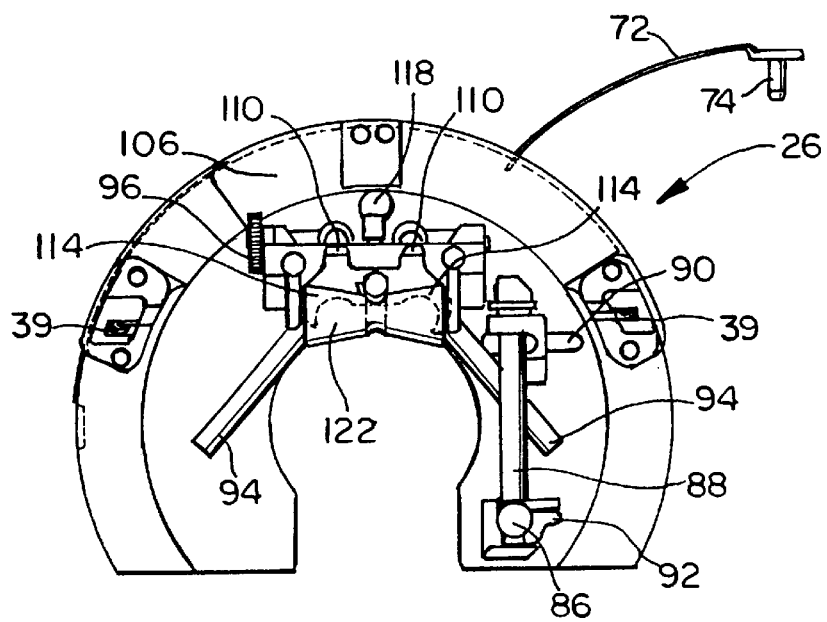
FIG. 5 is a rear elevational view of the cable lasher shown in FIG. 1 depicting rear vertical rollers, a rear gate roller, and rear strand locks and claws in the open position.
Figure 11:
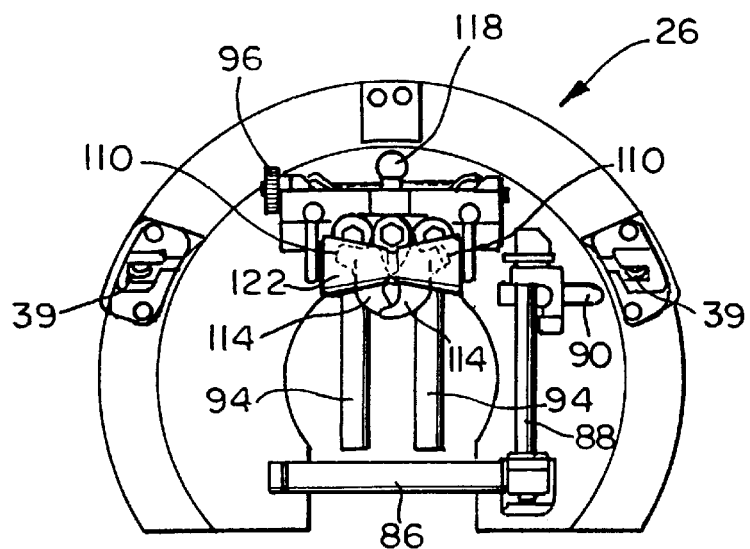
FIG. 11 is a rear elevational view of the cable lasher similar to FIG. 5 except that the side doors, the rear vertical rollers, rear gate roller, and rear strand locks are all in their respective closed positions and wherein the claws of the rear strand locks are depicted in an overlapping closed position.

As shown in FIGS. 5 and 11, a rear gate roller 86 is mounted on the rear end 26 of the lasher for the cable to rests on the rear gate roller as the cable lasher 20 rides on the support strand. The rear gate roller 86 is rotatably mounted relative to a shaft 88 mounted at the rear end 26 of the lasher so that the roller can swing open and closed about the shaft 88. A rear gate roller release knob 90 is provided to release the rear gate roller into an open position. When the rear gate roller release knob 90 is pushed, the rear gate roller 86 is spring loaded to swing open. As shown in FIG. 5, the rear gate roller 86 is in the open position so that the cable lasher 20 can be mounted on or removed from the cable passing through the lasher. When the rear gate roller is opened, the drum is prevented from rotating. As shown in FIG. 11, the rear gate roller 86 is now in the closed position to help retain the lasher on the cable when the cable lasher 20 is in operation.

A thumb latch 92 is also provided for the rear gate roller 86 to enable the roller 86 to be slidably adjustable along shaft 88. The thumb latch 92 functions to permit inward and outward adjustment of the rear gate roller 86 relative to the central axis of the lasher. A rear strand roller 122 opposes the rear gate roller for simultaneously engaging the strand and the cable during use. When the two ends of the thumb latch 92 are pinched together, the rear gate roller 86 is free to slide up and down the shaft 88 either closer to or further away from the rear strand roller. When the desired height of the rear gate roller 86 is achieved relative to the rear strand roller, the user releases the thumb latch 92 and the vertical position of the rear gate roller 86 is maintained. The adjustment of the rear gate roller along shaft 88 allows for proper arrangement of the support strand and the cable during lashing.

Two vertical rollers 94 are mounted at the rear end 26 of the lasher to cooperate with the rear gate roller and the rear strand roller to hold the cable in proper position for the cable to pass therebetween as the cable lasher 20 rides on the support strand. The vertical rollers 94 are movable from a generally parallel closed position as shown in FIG. 11 to a generally v-shaped open position as shown in FIG. 5. The vertical rollers 94 cooperate with the rear gate roller 86 and the rear strand roller 122 to form a roller enclosure about the transmission cable to guide the cable through the lasher as the cable lasher 20 rides on the support strand. The width of the spacing between the vertical rollers 94 can be adjusted by an adjusting screw 96. The rolling surfaces of the vertical rollers 94, the rear gate roller 86, and the rear strand roller ensures that the cable never contacts a static surface as the cable lasher 20 rides on the support strand. The adjustability of the vertical rollers 94 and the rear gate roller 86 ensures that the cable is snugly captured as the cable lasher 20 rides on the support strand.

Figure 8:
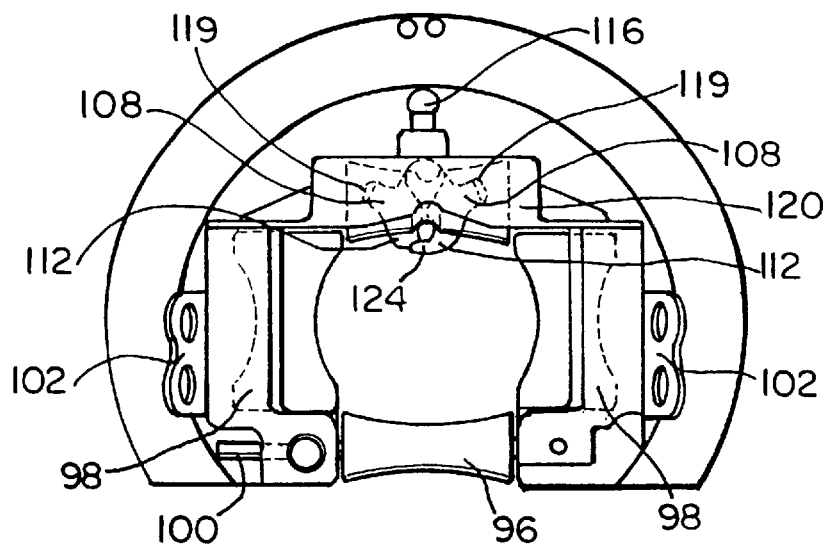
FIG. 8 is a front elevational view of the cable lasher similar to FIG. 2 except that the front gate roller and front strand locks are in the closed position and the claws of the front strand locks are in a closed overlapping position.
Figure 9:
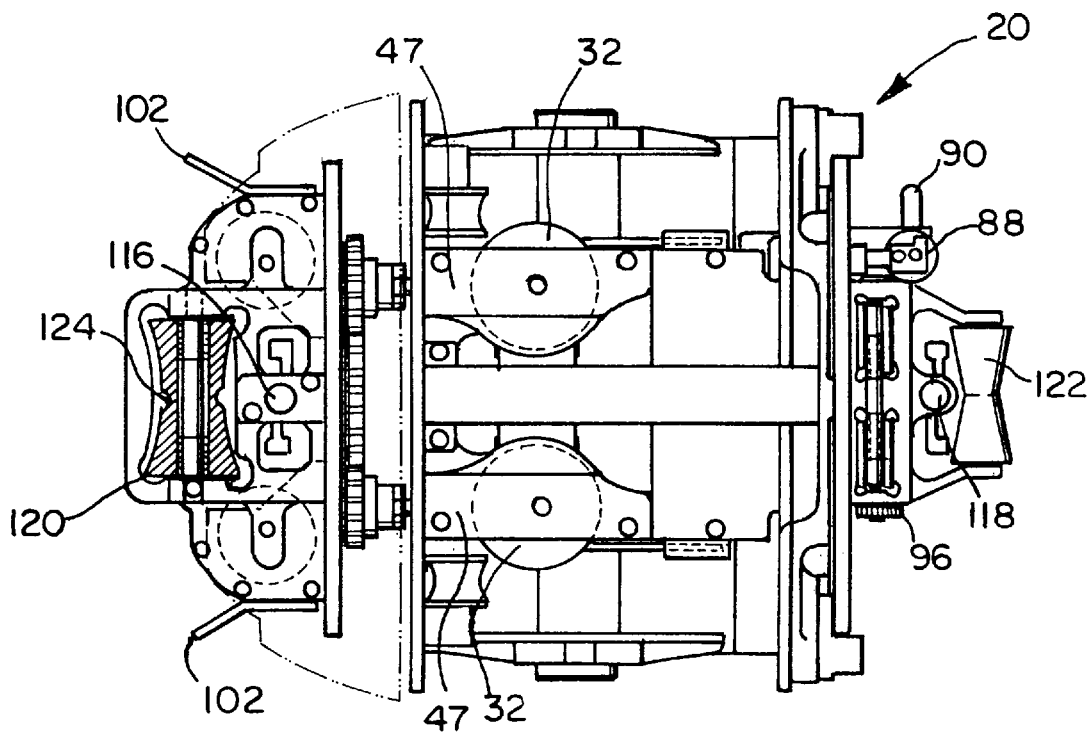
FIG. 9 is a top plan view of the cable lasher similar to FIG. 3 except that the side doors have been removed for purposes of clarity and the rear gate roller is in the closed position.

As shown in FIGS. 2 and 8, a front gate roller 96, a front strand roller 120 and two front vertical rollers 98 are mounted at the front end 24 of the lasher 22 to provide a circular surface of rollers generally conforming to the outside diameter of the cable. These rollers are also configured so that the cable entering the cable lasher 20 never contacts a static surface. The circular configuration of the outer surfaces of the rollers permits the cable to maintain constant contact with the surface of the rollers as the lasher rides on the support strand regardless of the direction of the pulling force on the lasher.

The front gate roller 96 is rotatably mounted on the front end 24 of the cable lasher 20. A front gate lever 100 is provided at the front end 24 of the cable lasher 20 and is spring loaded to swing open the front gate roller 96 when the front gate roller lever 100 is actuated. As shown in FIG. 2, the front gate roller 96 is in the open position to enable the cable lasher 20 to be mounted on or removed from the cable. As shown in FIG. 8, the front gate roller 96 is in the closed position to hold the lasher in place on the cable whenever the lasher 20 is in operation riding on the support strand.

Towing brackets 102 are provided at the front end 24 of the lasher 20. A bridle assembly is attached to the towing brackets and a handline is then attached to the bridle assembly to permit the cable lasher 20 to be pulled along the support strand by a worker or with the assistance of a vehicle or capstan winch.

As shown in FIGS. 1, 4, 5, 6, and 10, a tapered front cowl 104 is provided on the front end 24 of the lasher. The front cowl 104 provides a nose cone having a back end with an outside circumference greater than the circumference of the trailing rotating drum 28 and the rear end 26 of the lasher for preventing objects from catching on the cable lasher 20 during use. An adapter bracket 106 is attached to the rear end of the rotating drum 28 and rotates with the rotating drum 28. The adapter bracket provides a mounting structure for the exit roller 39 for the lashing wire as well as a mounting structure for a carry handle for the lasher. The circumference of the adapter bracket 106 is equal to or smaller than the circumference of the tail end portion of the front cowl 104. Since the front cowl 104 has a circumference greater than the rotating drum 28, doors 72, and rear end 26, the cable lasher 20 is able to pass by trees or other obstructions without the use of external guarding. In operation, the front cowl 104 functions to minimize contact of the rotating drum 28 with obstructions.

As shown in FIGS. 2, 5, 8, and 11, front strand locks 108 are located at the front end 24 and rear strand locks 110 are located at the rear end 26, respectively, of the lasher for latching onto the strand to hold the lasher on the strand. The front and rear strand locks 108, 110 are respectively comprised of two front jaws 112 and two rear jaws 114. The front jaws 112 and the rear jaws 114 can be opened apart for releasing the support strand or closed into an overlapping position for holding the support strand. The overlapping position of the front and rear jaws 112, 114 ensures that the support strand will not slip from the grasp of the jaws. The front jaws 112 and rear jaws 114 are respectively opened using front and rear lock knobs 116, 118. When the front and rear lock knobs 116, 118 are pulled up, the front and rear strand locks 108, 110 are respectively opened. The respective strand locks are closed into an overlapping position by squeezing the jaws together using grip pads 119.

As shown in FIGS. 2 and 5, the front and rear strand locks 108, 110 and the associated front and rear jaws 112, 114 are in the open position for installing the cable lasher 20 on the support strand. As shown in FIGS. 8 and 11, the front and rear strand locks 108, 110 and the associated front and rear jaws 112, 114 are in the closed overlapping position to retain the cable lasher 20 on the strand during use. By providing strand locks on both the front end 24 and the rear end 26 of the lasher, additional support and security is achieved during installation and operation of the cable lasher 20.

As shown in FIGS. 2, 3, and 5, the front strand roller 120 and the rear strand roller 122 may be fabricated from a urethane material and configured so that each roller includes a central groove dimensioned to rest upon and receive the strand to provide guidance for the support strand passing through the cable lasher 20. The lasher is guided on the support strand by the front and rear strand rollers 120, 122 as the cable lasher rides on the support strand. The front strand roller 120 has a u-shaped groove 124 at the center of the front strand roller 120 for resting upon the support strand as the cable lasher 20 moves. The rear strand roller may include a similar groove. The front strand roller 120 also contains a one-way clutch mechanism to assure that the cable lasher 20 only travels in a forward direction.

With the foregoing description in mind, the cable lasher 20 operates as follows. The front gate roller 96 and the rear gate roller 86 are opened by releasing the front gate lever 100 and the rear gate release knob 90. The front strand locks 108 and rear strand locks 110 are opened by pulling up the front and rear lock knobs 116, 118. The lashing wire 38 is the threaded through the tensioning rollers 34, 36, and around the drive wheel 32. The cable lasher 20 is then installed on the cable and the support strand. The front and rear strand locks 108, 110 are closed to retain the cable lasher 20 on the support strand. The front gate roller 86 is then closed. The lashing wire 38 is then pulled from the rear end 26 of the frame 22 through the exit roller 39 and attached to the support strand. The rear gate roller 96 is closed. The rear gate roller 86 is then vertically adjusted along the shaft 88 with the thumb latch 92. A bridle is attached to the towing brackets 102 on the front end of the frame 22 and a towline is then secured to the bridle.

The cable lasher 20 is then pulled in the forward direction from any pulling angle. As the cable lasher 20 is pulled, the gearbox 46 translates linear motion of the lasher along the guide strand into rotational motion of the rotating drum 28. As the rotating drum 28 rotates, lashing wire 38 from the reel of lashing wire 30 is dispensed and helically wrapped around the cable and the support strand lashing them together.

It will be recognized by those skilled in the art that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the claims.

What is claimed is:

1. A cable lasher riding on a support strand for attaching a cable to the support strand with wire, comprising:

(a) a frame that is movable on the cable and the strand;
   (b) a reel of lashing wire attached to the frame;
   (c) a series of tensioning rollers for the lashing wire for maintaining tension in the wire at all times.

2. A cable lasher riding on a support strand for attaching a cable to the support strand with wire, comprising:

(a) a frame that is movable on the cable and the strand;
   (b) a reel of lashing wire attached to the frame;
   (c) a rotating drum attached to the frame; and
   (d) a gearbox, driven by the wire from the reel of lashing wire, for translating linear motion of the frame into rotational motion of the drum for causing the wire to be wrapped around the cable and the support strand.

3. A cable lasher riding on a support strand for attaching a cable to the support strand with wire, comprising:

(a) a frame that is movable on the cable and the strand;
   (b) a reel of lashing wire attached to the frame;
   (c) a rotating drum attached to the frame;
   (d) a drive wheel driven by the wire from the reel of lashing wire;
   (e) a series of tensioning rollers for the lashing wire, wherein said tensioning rollers and drive wheel cooperate to maintain constant tension in the wire at all times; and
   (f) a gearbox, driven by the drive wheel for translating linear motion of the frame into rotational motion of the drum for wrapping the wire around the cable and the support strand.

4. A cable lasher riding on a support strand for attaching a cable to the support strand with wire, comprising:

(a) a frame that is movable on the cable and the strand;
   (b) a reel of lashing wire attached to the frame;
   (c) a rotating drum attached to the frame;
   (d) a drive wheel driven by wire from the reel of lashing wire;
   (e) a gearbox for translating linear motion of the frame into rotational motion of the rotating drum in one direction, the gearbox including a bevel gear in removable engagement with the drive wheel;
   (f) a clutch fork for disengaging the drive wheel from the bevel gear; and
   (g) a clutch release lever for displaying the clutch fork to disengage the drive wheel from the bevel gear to prevent the drive wheel from driving the gearbox.

5. A cable lasher riding on a support strand for attaching a cable to the support strand with wire, comprising:

(a) a frame that is movable on the cable and the strand;
   (b) an outer housing;
   (c) a reel of lashing wire supported relative to the frame and recessed into the housing for preventing objects from catching on the reel;
   (d) a door for covering the reel of lashing wire;
   (e) a lock tab attached to the door; and
   (f) a lock bolt, held in rotatable position on the lock tab, for screwing into the housing for securing the door in a closed position, and recessed into the housing when the door is closed, for securing the door to the housing.

6. A cable lasher riding on a support strand for attaching a cable to the support strand with wire, comprising:

(a) a frame that is movable on the cable and the strand;

(b) a reel of lashing wire attached to the frame;

(c) an outer reel cover for the reel of lashing wire; and (d) at least one view slot in the reel cover that is wider proximate to the center of the reel of lashing wire and narrower distal to the center of the reel of lashing wire for showing the amount of wire remaining on the reel.

7. A cable lasher riding on a support strand for attaching a cable to the support strand with wire, comprising:

(a) a frame that is movable on the cable and the strand;

(b) a reel of lashing wire attached to the frame;

(c) a rotating drum attached to the frame;

(d) at least one lock notch on the outside circumference of the reel of lashing wire; and (e) a reel lock attached to the rotating drum for removably engaging the notch on the outside circumference of the reel of lashing wire for holding the reel of lashing wire in position.

8. A cable lasher riding on a support strand for attaching a cable to the support strand with wire, comprising:

(a) a frame that is movable on the cable and the strand;

(b) a front end of the frame;

(c) a rear end of the frame;

(d) a spring-loaded rear gate roller attached to the rear end for the cable to ride upon; and (e) a release knob for opening and closing the rear gate roller wherein upon actuation of the knob, the rear gate roller is spring biased to an open position.

9. A cable lasher riding on a support strand for attaching a cable to the support strand with wire, comprising:

(a) a frame that is movable on the cable and the strand;

(b) a front end of the frame;

(c) a rear end of the frame;

(d) a shaft attached to the rear end;

(e) a rear gate roller rotatable attached to the shaft for the cable to ride on; and (f) a thumb latch located on the rear gate roller for slidably adjusting the position of the rear gate roller along the shaft to accommodate different cable diameters.

10. A cable lasher riding on a support strand for attaching a cable to the support strand with wire, comprising:

(a) a frame that is movable on the cable and the strand;

(b) a front end of the frame;

(c) a rear end of the frame; and (d) a series of rollers attached to the front end of the frame forming a circular surface of rollers generally conforming to the outside diameter of the cable, so that the cable maintains contact with the surface of at least one of the rollers regardless of the direction of the pulling force on the lasher.

11. A cable lasher riding on a support strand for attaching a cable to the support strand with wire, comprising:

(a) a frame that is movable on the cable and the strand;

(b) a front end of the frame;

(c) a rear end of the frame;

(d) a rotating drum attached to the frame between the front end and the rear end;

(e) doors mounted on the rotating drum; and (f) a tapered front cowl covering the front end, the cowl having an outer circumference greater than the doors, the rotating drum and the rear end for preventing objects from catching on the frame.

12. A cable lasher riding on a support strand for attaching a cable to the support strand with wire, comprising:

(a) a frame that is movable on the cable and the strand;

(b) a front end of the frame;

(c) a rear end of the frame; and (d) strand locks located at the front end and the rear end for capturing the support strand, the strand locks having jaws which can be opened apart and closed in an overlapping position for holding the support strand to allow the frame to ride on the support strand.

13. A cable lasher riding on a support strand for attaching a cable to the support strand with wire, comprising:

(a) a frame that is movable on the cable and the strand;

(b) a front end of the frame;

(c) a gearbox attached to the frame;

(d) a front strand roller mounted on the front end of the frame, having a one-way clutch mechanism for engaging and disengaging the front strand roller relative to the gearbox; and (e) a groove at the center of the front strand roller for receiving the support strand and maintaining the frame on the support strand as the cable lasher moves, wherein the one-way clutch mechanism, when engaged, allows the cable lasher to move only in the forward direction.

14. A cable lasher riding on a support strand for attaching a cable to the support strand with wire, comprising a front strand roller and a rear strand roller for riding upon the support strand wherein the strand rollers are formed from urethane, and are hour-glass shaped, containing a gradual taper to a central groove, to guide the support strand within the central groove.

15. A cable lasher riding on a support strand for attaching a cable to the support strand with wire, comprising:

(a) a frame that is movable on the cable and the strand;

(b) a front end of the frame;

(c) a rear end of the frame;

(d) a reel of lashing wire attached to the frame;

(e) a rotating drum attached to the frame;

(f) a drive wheel driven by the wire from the reel of lashing wire;

(g) a gearbox for translating linear motion of the frame into rotational motion of the rotating drum for attaching the cable to the support strand with the wire, the gearbox includes a bevel gear in removable engagement with the drive wheel;

(h) a clutch fork for disengaging the drive wheel from the bevel gear;

(i) a series of tensioning rollers for the lashing wire for maintaining constant tension in the wire at all times; and (j) a clutch release lever for displaying the clutch fork to disengage the drive wheel from the bevel gear to prevent the drive wheel from driving the gearbox.

16. A cable lasher riding on a support strand for attaching a cable to the support strand with wire, comprising:

(a) a frame that is movable on the cable and the strand;

(b) a lashing assembly attached to the frame, having a reel of lashing wire, a drive wheel, and a series of tensioning rollers;

wherein said tensioning rollers and drive wheel cooperate to maintain constant tension in the wire from the reel of lashing wire.

17. The cable lasher of claim 1, further comprising:
(a) a bracket attached to the frame for supporting the series of tensioning rollers; and
(b) a plurality of adjusting holes in the bracket, arranged to permit the relocation of one tensioning roller of the series of tensioning rollers relative to another tensioning roller of the series, to enable the amount of tension in the lashing wire to be adjusted.

18. The cable lasher of claim 3, further comprising:
(a) a bracket attached to the frame for supporting the series of tensioning rollers; and
(b) a plurality of adjusting holes in the bracket, arranged to permit the relocation of one tensioning roller of the series of tensioning rollers relative to another tensioning roller of the series, to enable the amount of tension in the lashing wire to be adjusted.

19. The cable lasher of claim 5, wherein the lock bolt screws into the center of the reel of lashing wire to secure the door to the housing.

20. The cable lasher of claim 5, wherein the lock tab is bent inwardly from the door toward the reel of lashing wire, so that when the door is secured in a closed position, the lock tab and lock bolt are completely recessed into the housing, so that the lock bolt does not project beyond the exterior of the door and the outer diameter of the housing thereby preventing foreign objects from snagging on the door and lock bolt.

21. The cable lasher of claim 10, wherein the series of rollers generally encloses the outer diameter of the cable.

22. The cable lasher of claim 10, wherein the series of rollers generally encircles the outer diameter of the cable.

* * * * *